United States Patent
Cano et al.

(10) Patent No.: US 11,034,209 B2
(45) Date of Patent: Jun. 15, 2021

(54) APPARATUS ALLOWING WIDER RANGE OF DISTRIBUTION OF AIR FROM A HEATING, VENTILATING AND AIR CONDITIONING SYSTEM IN A MOTOR VEHICLE

(71) Applicant: FORD GLOBAL TECHNOLOGIES, LLC, Dearborn, MI (US)

(72) Inventors: Dejvi Cano, Grosse Pointe Park, MI (US); Michael Murphy McElroy, South Lyon, MI (US); Nitish Kannan Nagarajan, Detroit, MI (US); Scott Holmes Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 16/172,262

(22) Filed: Oct. 26, 2018

(65) Prior Publication Data
US 2020/0130458 A1     Apr. 30, 2020

(51) Int. Cl.
*B60H 1/00* (2006.01)
*B60H 1/24* (2006.01)
*B60H 1/30* (2006.01)

(52) U.S. Cl.
CPC ..... *B60H 1/00564* (2013.01); *B60H 1/00021* (2013.01); *B60H 1/241* (2013.01); *B60H 1/30* (2013.01); *B60H 2001/00185* (2013.01)

(58) Field of Classification Search
CPC ............ B60H 1/00564; B60H 1/00021; B60H 1/241; B60H 1/30; B60H 2001/00185; F16L 27/12

USPC .......................................... D23/355, 387, 388
See application file for complete search history.

(56) References Cited

U.S. PATENT DOCUMENTS

| | | | | |
|---|---|---|---|---|
| 3,550,522 A | * | 12/1970 | Bauer | B60H 1/00564 454/144 |
| 3,892,049 A | * | 7/1975 | Adams, Jr. | D06F 58/20 34/235 |
| 4,020,753 A | * | 5/1977 | Efstratis | F16L 27/12 454/306 |
| 5,645,482 A | * | 7/1997 | Moss | D06F 58/04 34/235 |

(Continued)

FOREIGN PATENT DOCUMENTS

| | | |
|---|---|---|
| DE | 102004005481 A1 | 8/2005 |
| IN | 2015MU00980 A | 9/2016 |

(Continued)

OTHER PUBLICATIONS

Tanaka, JP 2005-225272 A English machine translation, Aug. 25, 2005 (Year: 2005).*

(Continued)

*Primary Examiner* — Kenneth J Hansen
*Assistant Examiner* — Phillip Decker
(74) *Attorney, Agent, or Firm* — David Coppiellie; King & Schickli, PLLC

(57) ABSTRACT

An apparatus allows for the distribution of air over a wider range of area. That apparatus includes a telescoping duct assembly, having an inner duct section received for sliding movement in an outer duct section, a receiver in the inner duct section, an elongated port in the outer duct section and an air register held in the receiver and projecting through the elongated port.

16 Claims, 6 Drawing Sheets

(56) References Cited

U.S. PATENT DOCUMENTS

| | | | |
|---|---|---|---|
| 9,746,107 B2 * | 8/2017 | Tani | B60H 1/00564 |
| 9,827,829 B2 | 11/2017 | Errick et al. | |
| 2011/0009045 A1 * | 1/2011 | Beckley | B60H 1/3407 |
| | | | 454/162 |
| 2017/0057324 A1 | 3/2017 | Krolewski et al. | |
| 2017/0072772 A1 * | 3/2017 | Salter | B60H 1/246 |
| 2019/0381858 A1 * | 12/2019 | Sadowski | B60H 1/00285 |

FOREIGN PATENT DOCUMENTS

| | | | | | |
|---|---|---|---|---|---|
| JP | 2002316528 A | * | 10/2002 | | |
| JP | 2002316528 A | | 10/2002 | | |
| JP | 2005225272 A | * | 8/2005 | | F16L 9/006 |
| JP | 2007015438 A | * | 1/2007 | | |
| JP | 2017039361 A | | 2/2017 | | |

OTHER PUBLICATIONS

English Machine Translation of DE102004005481A1 dated Aug. 25, 2005.

English Machine Translation of IN2015MU00980a dated Sep. 30, 2016.

English Machine Translation of JP2002316528A dated Oct. 29, 2002.

English Machine Translation of JP2017039361A dated Feb. 23, 2017.

* cited by examiner

APPARATUS ALLOWING WIDER RANGE OF DISTRIBUTION OF AIR FROM A HEATING, VENTILATING AND AIR CONDITIONING SYSTEM IN A MOTOR VEHICLE

TECHNICAL FIELD

This document relates generally to the motor vehicle equipment field and, more particularly, to a new and improved apparatus allowing for a wider range of distribution of air from the heating, ventilating and air conditioning system in a motor vehicle.

BACKGROUND

More and more motor vehicles are incorporating more versatile cabin arrangements that often provide a wider variety of seating positions and orientations. This trend is expected to continue with the development of autonomous motor vehicles.

This document relates to a new and improved apparatus that is especially adapted for enhancing the distribution of air from a heating, ventilating and air conditioning system in a motor vehicle. Such an apparatus is better equipped or configured to distribute that air over a wider area thereby accommodating air distribution to a wider range of seating positions and orientations and thus increasing consumer satisfaction with the motor vehicle.

SUMMARY

In accordance with the purposes and benefits as described herein, a new and improved apparatus is provided for providing enhanced distribution from a heating, ventilating and air conditioning system (HVAC) in a motor vehicle. That apparatus comprises: (a) a telescoping duct assembly including an inner duct section received for sliding movement within an outer duct section, (b) a receiver in the inner duct section, (c) an elongated port in the outer duct section and (d) an air register held in the receiver and projecting through the elongated port.

Where the apparatus is part of a door of the motor vehicle, the apparatus may further include a door substrate, a door trim panel and a compartment between the door trim panel and the door substrate. The telescoping duct assembly may be received and held in that compartment.

In addition, the apparatus may further include a mounting feature for fixing the outer duct section to the door substrate. That mounting feature may include a first set of opposed lugs on the outer duct section engaging with a second set of opposed lugs on the door substrate. In addition, the apparatus may further include an adjustment guide on the door trim panel aligned over the elongated port in the outer duct section. The air register may also project through this adjustment guide.

The air register may include a plurality of adjustable vanes to direct air passing through the air register. The telescoping duct assembly of the apparatus may further include a guideway. That guideway may include a guide track carried on the outer duct section and a guide track follower carried on the inner duct section wherein the guide track follower is received in and slides along the guide track. In addition a seal may be carried on the open end of the outer duct section. That seal may be adapted to connect with an air distribution duct of the HVAC system of the motor vehicle.

In another possible embodiment, the apparatus may further include a mounting feature fixing the outer duct section to the door trim panel. That mounting feature may include a first set of opposed lugs on the outer duct section engaging with a second set of opposed lugs on the door trim panel. In such an embodiment, the apparatus my further include an adjustment guide on the door trim panel aligned over the elongated port in the outer duct section. The air register may also project through the adjustment guide. Further, the air register may include a plurality of adjustable vanes to direct air passing through the air register.

The telescoping duct assembly may further include a guideway. That guideway may include a guide track carried on the outer duct section and a guide track follower carried on the inner duct section wherein the guide track follower is received in and slides along the guide track.

In accordance with yet another aspect, the apparatus may further include an air scoop. That air scoop may have a base connected to the air register and an air deflection surface extending into the inner duct section and adapted to deflect air from the inner duct section into the air register.

In the following description, there are shown and described several preferred embodiments of the apparatus. As it should be realized, the apparatus is capable of other, different embodiments and its several details are capable of modification in various, obvious aspects all without departing from the apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and the seat assembly and together with the description serve to explain certain principles thereof.

Reference will now be made in detail to the present preferred embodiments of the apparatus, examples of which are illustrated in the accompanying drawing figures.

DETAILED DESCRIPTION

Figure 1:
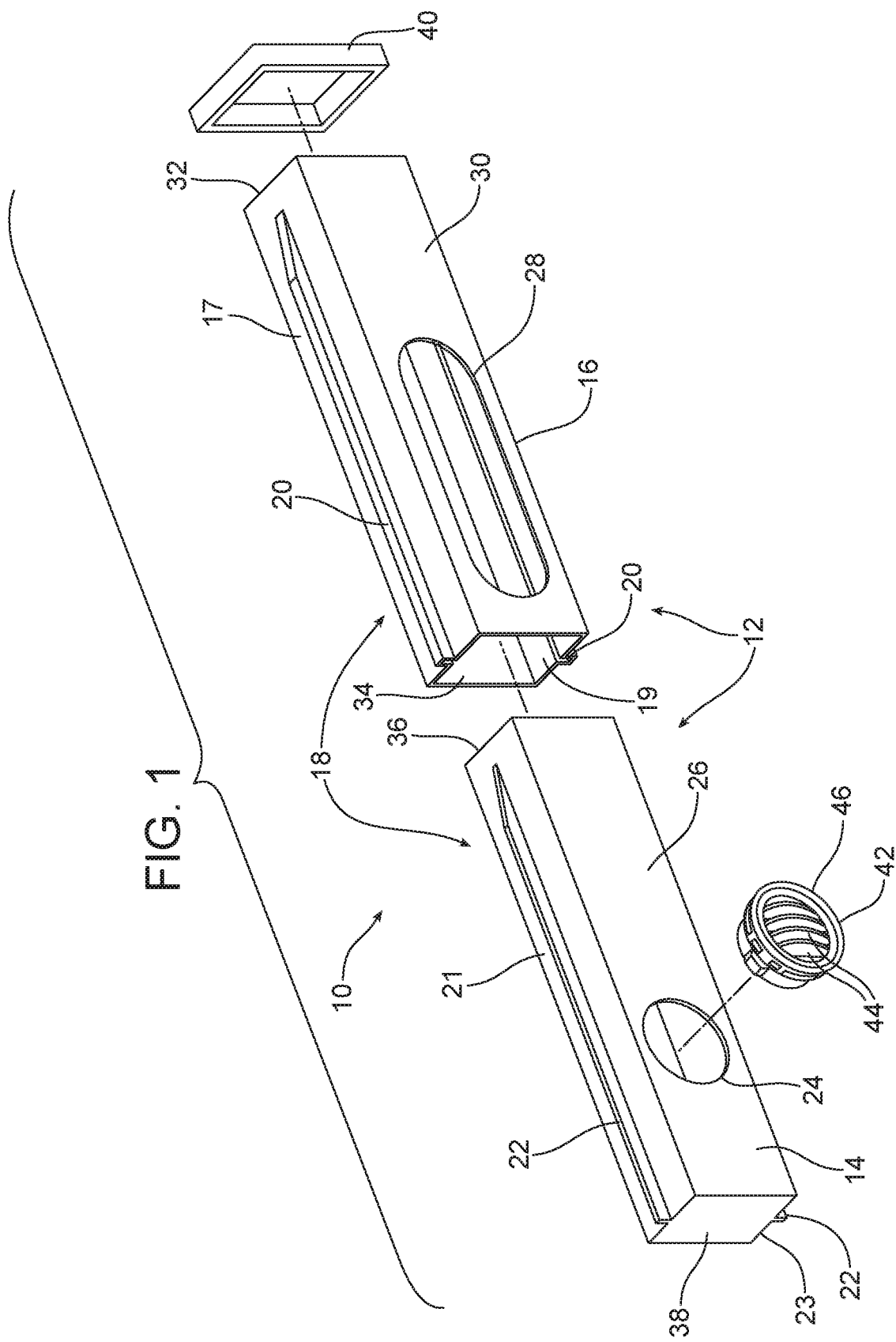
FIG. 1 is an exploded perspective view of the apparatus illustrating the telescoping duct assembly including the inner duct section and the outer duct section, the air register that is received and held in the inner duct section and the seal at the open end of the telescoping duct assembly.
Figure 2:
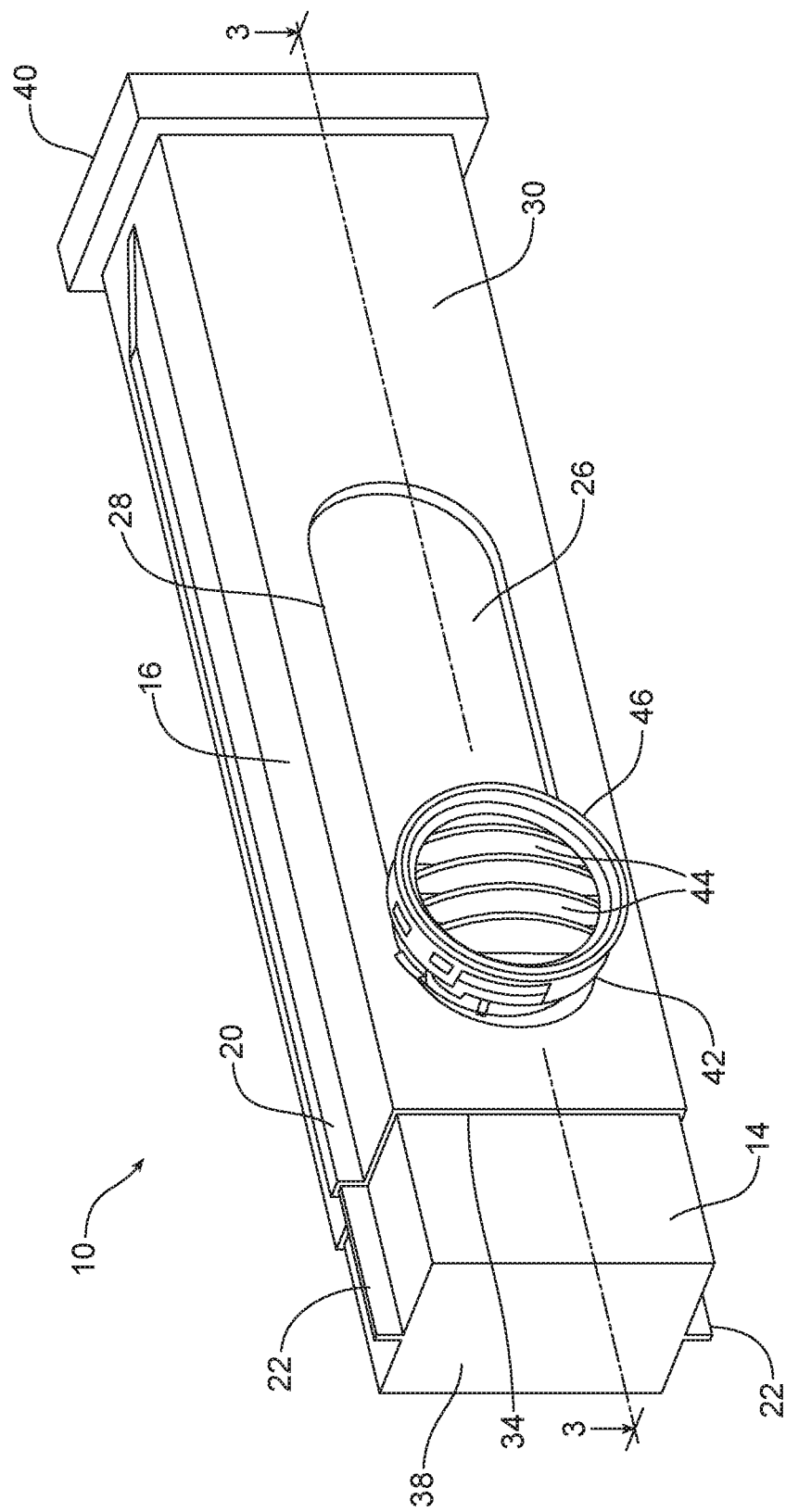
FIG. 2 is a view of the apparatus as illustrated in FIG. 1 in the fully assembled condition.
Figure 3:
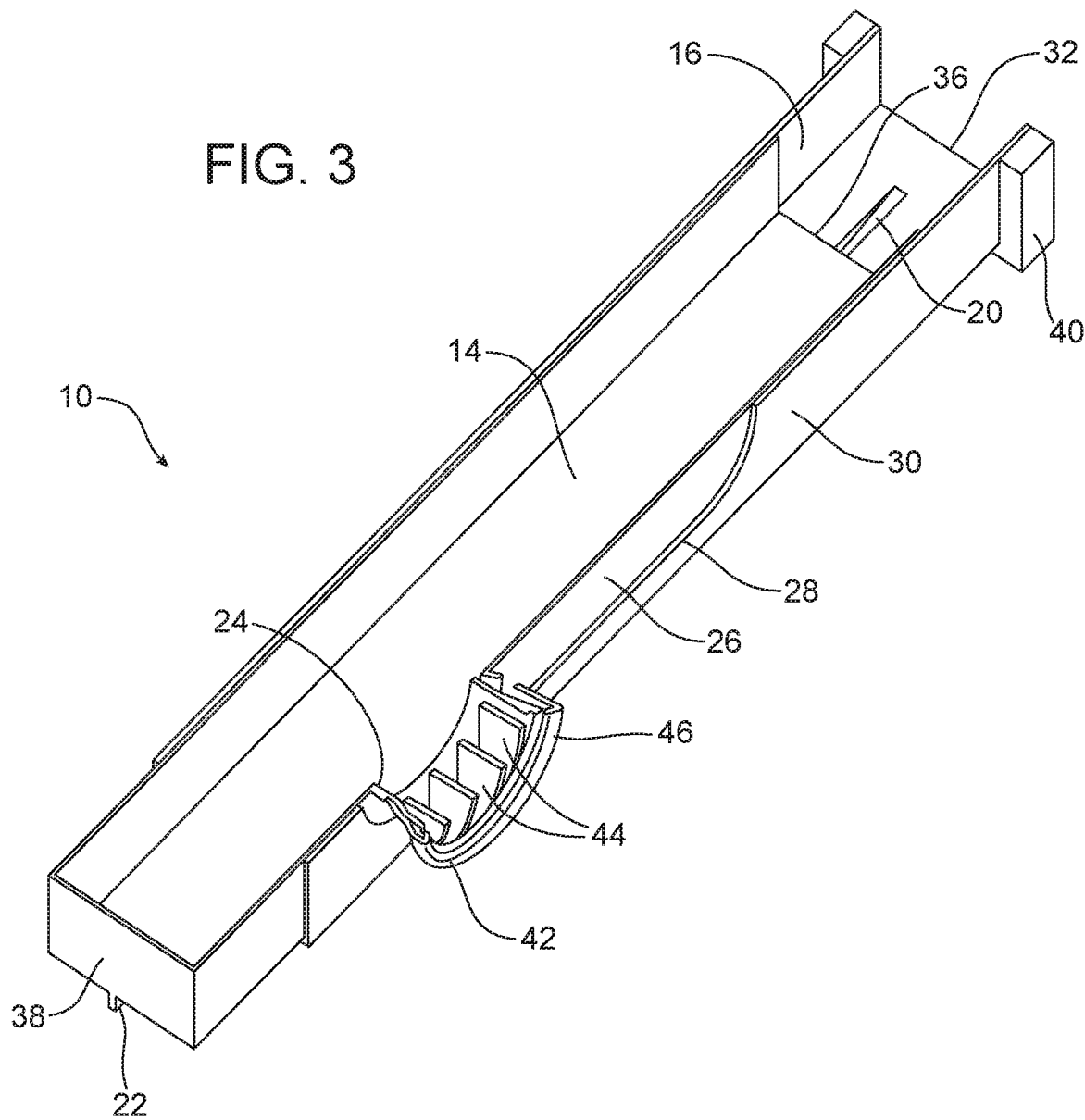
FIG. 3 is a longitudinal cross sectional view taken along lines 3-3 of FIG. 2.

Reference is now made to FIG. 1-3 illustrating the apparatus 10 that is adapted to provide enhanced distribution of air from an HVAC system over a wider area of range of a motor vehicle. Such an apparatus 10 is better configured to deliver air to a user at a desired point regardless of the position or location of the seating within a motor vehicle.

As illustrated in FIGS. 1-3, the apparatus 10 includes a telescoping duct assembly 12 including an inner duct section 14 received for sliding movement within an outer duct section 16.

As further illustrated in those drawing figures, the telescoping duct assembly 12 includes a guideway 18. That guideway 18 includes a guide track 20 in the form of opposed channels carried on opposed walls 17, 19 of the outer duct section 16 and a cooperating guide track follower 22, in the form of opposed flanges, carried on opposed walls 21, 23 of the inner duct section 14. As shown, the guide track follower 22 is received in and slides along the guide track 20.

The apparatus 10 further includes a receiver 24, in the form of an aperture, formed in a front sidewall 26 of the inner duct section 14. An elongated port 28 is provided in the front sidewall 30 of the outer duct section 16.

The outer duct section 16 includes a first end 32 and a second end 34. The inner duct section 14 includes an open proximal end 36 and a closed distal end 38. The open proximal end 36 of the inner duct section 14 is received in the second end 34 of the outer duct section 16. The first end 32 of the outer duct section 16 is open and receives a seal 40 adapted to connect the telescoping duct assembly 12 to a delivery duct (not shown) that delivers air to the telescoping duct assembly 12 from the HVAC system of the motor vehicle.

An air register 42 is held in the receiver 24 and projects through the elongated port 28 in the outer duct section 16. In the illustrated embodiment, the air register 42 includes a plurality of adjustable vanes 44 of a type known in the art, adapted to direct air passing through the air register 42 into the passenger cabin or compartment of the motor vehicle. As is known in the art, the plurality of vanes 44 may be fully closed to prevent distribution of air from the HVAC system through the air register 42, fully opened to allow the maximum distribution of air from the HVAC system through the air register system 42 or partially opened as desired. As illustrated, the plurality of vanes 44 are held in a bezel 46 that may be rotated within the receiver 44 in order to reorient the vanes as desired.

As should be appreciated, the apparatus 10 illustrated in FIGS. 1-3 may be positioned substantially anywhere throughout the passenger cabin or compartment of the motor vehicle. In one particularly useful embodiment illustrated in FIG. 4, the apparatus 10 described above is shown positioned within a door 50 of the motor vehicle. In such an embodiment, the apparatus 10 may further include a door substrate 52, a door trim panel 54 and a compartment 56 between the door trim panel and the door substrate. In such an embodiment, the telescoping duct assembly 12 is received and held in the compartment 56.

Figure 4:
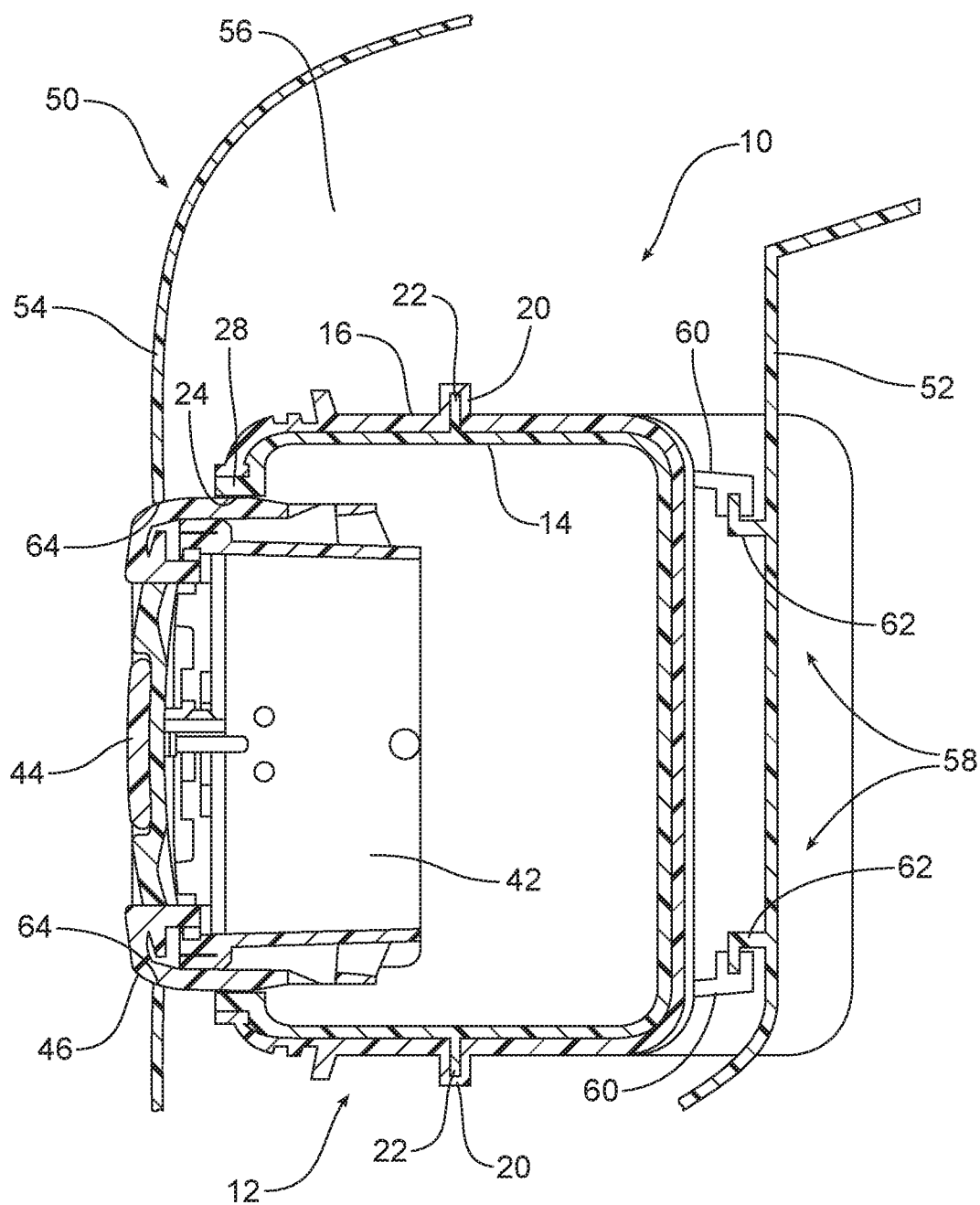
FIG. 4 is a transverse cross sectional view of one embodiment of the apparatus wherein the outer duct section is mounted to the door substrate of a motor vehicle.

More particularly, in the embodiment illustrated in FIG. 4, a mounting feature 58 fixes the outer duct section 16 of the telescoping duct assembly 12 to the door substrate 52. In the illustrated embodiment, that mounting feature 58 includes a first set of opposed lugs 60 on the outer duct section 16 that engage with a second set of opposed lugs 62 provided on the door substrate 52. Further, an adjustment guide 64 in the form of an elongated slot substantially corresponding in size and shape to the elongated port 28 is provided on the door trim panel 54 aligned over the elongated port in the outer duct section 16. The air register 42 also projects through the adjustment guide 64.

Figure 5:
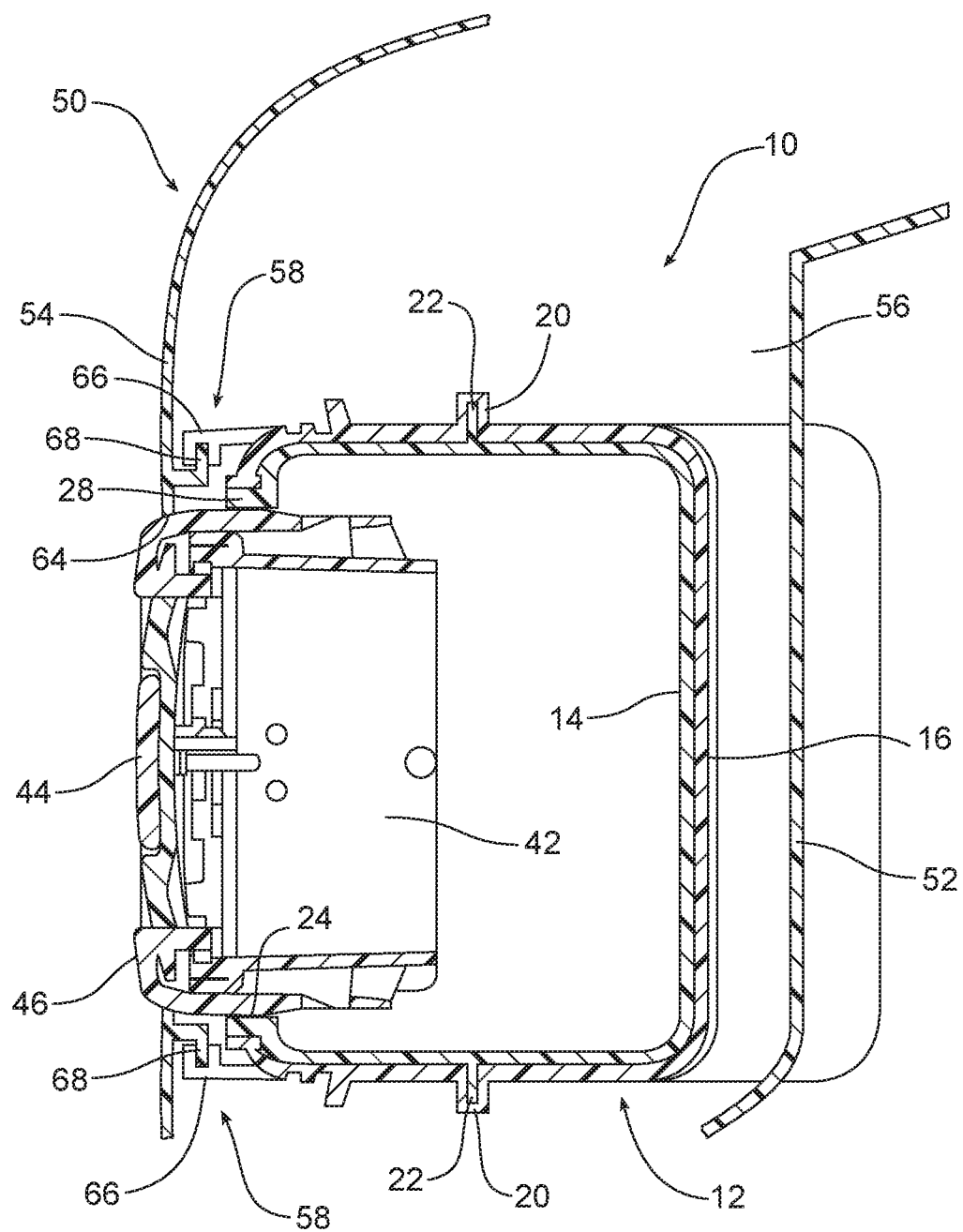
FIG. 5 is a transverse cross sectional view of the apparatus wherein the outer duct section of the telescoping duct assembly is mounted to the door trim panel of a motor vehicle.

In the embodiment illustrated in FIG. 5, the mounting feature 58 includes a first set of opposed lugs 66 on the outer duct section 16 engaging with a second set of opposed lugs 68 on the door trim panel 54. Once again, an adjustment guide 64 is provided on the door trim panel 54 aligned over and corresponding with the elongated port 28 in the outer duct section 16. Further, the air register 42 again projects through the adjustment guide 64.

Figure 6:
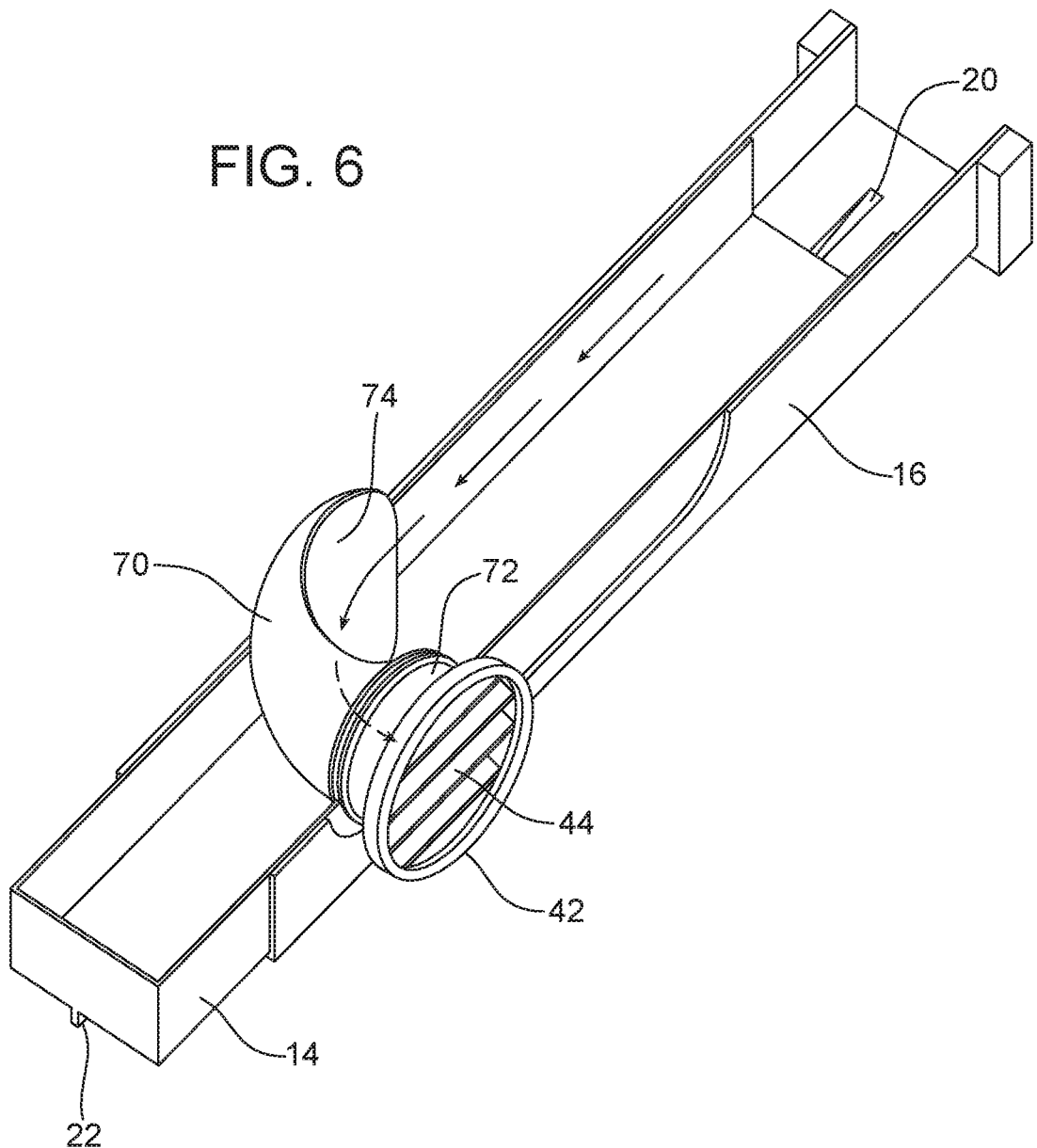
FIG. 6 is a detailed illustration of an air scoop connected to the air register and adapted to deflect air from the inner duct section of the telescoping duct assembly into and through the air register.

The foregoing has been presented for purposes of illustration and description. It is not intended to be exhaustive or to limit the embodiments to the precise form disclosed. Obvious modifications and variations are possible in light of the above teachings. For example, as illustrated in FIG. 6, the apparatus 10 may further include an air scoop 70 having a base 72, in the form of a ring or collar, that is connected to the air register 42 and an air deflection surface 74 curved so as to deflect air passing through the telescoping duct assembly 12 through the base 72 into the air register 42 for distribution into the passenger cabin or compartment of the motor vehicle by means of the plurality of vanes 44.

All such modifications and variations are within the scope of the appended claims when interpreted in accordance with the breadth to which they are fairly, legally and equitably entitled.

What is claimed:

1. An apparatus, comprising:
a telescoping duct assembly including an inner duct section received for sliding movement within an outer duct section;
a receiver in said inner duct section;
an elongated port in said outer duct section; and
an air register held in said receiver and projecting through said elongated port;
a door substrate, a door trim panel and a compartment between said door trim panel and said door substrate, said telescoping duct assembly being received and held in said compartment;
and a mounting feature fixing said outer duct section to said door substrate.

2. The apparatus of claim 1, wherein said mounting feature includes a first set of opposed lugs on said outer duct section engaging with a second set of opposed lugs on said door substrate.

3. The apparatus of claim 1, further including an adjustment guide on said door trim panel aligned over said elongated port in said outer duct section.

4. The apparatus of claim 3, wherein said air register also projects through said adjustment guide.

5. The apparatus of claim 4, wherein said air register includes a plurality of adjustable vanes to direct air passing through said air register.

6. The apparatus of claim 5, wherein said telescoping duct assembly further includes a guideway.

7. The apparatus of claim 6, wherein said guideway includes a guide track carried on said outer duct section and a guide track follower carried on said inner duct section wherein said guide track follower is received in and slides along said guide track.

8. The apparatus of claim 7, further including a seal carried on an open end of said outer duct section.

9. The apparatus of claim 1, further including an air scoop having a base connected to said air register and an air deflection surface extending into said inner duct section and adapted to deflect air from said inner duct section into said air register.

10. An apparatus, comprising:
- a telescoping duct assembly including an inner duct section received for sliding movement within an outer duct section;
- a receiver in said inner duct section;
- an elongated port in said outer duct section; and
- an air register held in said receiver and projecting through said elongated port;
- a door substrate, a door trim panel and a compartment between said door trim panel and said door substrate, said telescoping duct assembly being received and held in said compartment; and
- a mounting feature fixing said outer duct section to said door trim panel.

11. The apparatus of claim 10, wherein said mounting feature includes a first set of opposed lugs on said outer duct section engaging with a second set of opposed lugs on said door trim panel.

12. The apparatus of claim 10, further including an adjustment guide on said door trim panel aligned over said elongated port in said outer duct section.

13. The apparatus of claim 12, wherein said air register also projects through said adjustment guide.

14. The apparatus of claim 13, wherein said air register includes a plurality of adjustable vanes to direct air passing through said air register.

15. The apparatus of claim 14, wherein said telescoping duct assembly further includes a guideway.

16. The apparatus of claim 15, wherein said guideway includes a guide track carried on said outer duct section and a guide track follower carried on said inner duct section wherein said guide track follower is received in and slides along said guide track.

* * * * *